(12) United States Patent
Hale et al.

(10) Patent No.: US 10,745,300 B2
(45) Date of Patent: Aug. 18, 2020

(54) CONFIGURATION FOR ELECTROCHEMICAL WATER TREATMENT

(71) Applicant: Bioionix, Inc., McFarland, WI (US)

(72) Inventors: Brian R. Hale, Lake Mills, WI (US); Jeremy Vogel, Fort Atkinson, WI (US)

(73) Assignee: Bioionix, Inc., McFarland, WI (US)

( * ) Notice: Subject to any disclaimer, the term of this patent is extended or adjusted under 35 U.S.C. 154(b) by 116 days.

(21) Appl. No.: 15/694,678

(22) Filed: Sep. 1, 2017

(65) Prior Publication Data

US 2018/0065867 A1 Mar. 8, 2018

Related U.S. Application Data

(60) Provisional application No. 62/383,092, filed on Sep. 2, 2016.

(51) Int. Cl.
*C02F 1/461* (2006.01)
*C02F 1/467* (2006.01)

(52) U.S. Cl.
CPC ............ *C02F 1/467* (2013.01); *C02F 1/4672* (2013.01); *C02F 1/46109* (2013.01);
(Continued)

(58) Field of Classification Search
CPC .... C02F 1/467; C02F 1/46109; C02F 1/4672; C02F 2001/46142; C02F 2001/46152;
(Continued)

(56) References Cited

U.S. PATENT DOCUMENTS 6,780,306 B2 8/2004 Schlager et al.
7,033,481 B1 4/2006 Schlager et al.
(Continued)

FOREIGN PATENT DOCUMENTS

CA 2183062 8/1995
EP 2675758 12/2013
(Continued)

OTHER PUBLICATIONS

International Written Opinion from PCT Application No. PCT/US2017/049972 dated Nov. 16, 2017.
(Continued)

*Primary Examiner* — Ciel P Contreras
(74) *Attorney, Agent, or Firm* — Nicholas A. Kees; Godfrey & Kahn, S.C.

(57) ABSTRACT

An electrochemical water treatment apparatus includes a treatment chamber formed by at least one wall and having an opening formed along the side for substantially the length of the treatment chamber, with a mounting plate applied to the opening. A set of cathodes and anodes are mounted to the mounting plate and positioned inside the chamber, each of the anodes having at least one cathode positioned on each of the two sides of the respective anode. At least two anode bus bars and two cathode bus bars are provided, each bus bar connectable to the power supply and connected to the respective electrodes near a respective end of the electrodes. An inlet adapter has a smaller cross sectional area at the first end connected to the treatment chamber inlet end, and a larger cross sectional area at the opposite end connected to the source of water to be treated. An outlet adapter has a smaller cross sectional area at the first end connected to the treatment chamber outlet end, and a larger cross sectional area at the second end connected to the destination for the treated water.

19 Claims, 5 Drawing Sheets

(52) U.S. Cl.
CPC ........... *C02F 2001/46142* (2013.01); *C02F 2001/46152* (2013.01); *C02F 2201/4611* (2013.01); *C02F 2303/04* (2013.01); *C02F 2303/22* (2013.01)

(58) Field of Classification Search
CPC .......... C02F 2201/4611; C02F 2303/04; C02F 2303/22
See application file for complete search history.

(56) References Cited

U.S. PATENT DOCUMENTS

| | | |
|---|---|---|
| 7,494,582 B2 | 2/2009 | Schlager et al. |
| 7,604,728 B2 | 10/2009 | Schlager |
| 8,961,751 B2 | 2/2015 | Tretheway et al. |
| 9,359,232 B2 | 6/2016 | Andersen |
| 10,071,921 B2 | 9/2018 | Johnson et al. |
| 2004/0108222 A1 | 6/2004 | Gattrell et al. |
| 2011/0147204 A1 | 6/2011 | Leiato et al. |
| 2015/0203385 A1* | 7/2015 | Revington ............. C10G 1/045 210/726 |

FOREIGN PATENT DOCUMENTS

| | | |
|---|---|---|
| KR | 101272295 | 6/2013 |
| WO | 2012110841 | 8/2012 |

OTHER PUBLICATIONS

Extended search report for European Application No. 17847665.1 dated Dec. 19, 2019.
Research on Electrochemical Behavior of Ti—Ir—Ru Anode Coating in Electrolytic Antifouling of Flowing Brine article by Liang, C. and Huang, N. dated Jan. 17, 2008.
International Search Report for International application No. PCT/US17/49972 dated Nov. 16, 2017.
Office Action for Chilean Patent Application No. 543-2019 dated Feb. 10, 2020.
Machine translation of Office Action for Chilean Patent Application No. 543-2019 dated Feb. 10, 2020.

* cited by examiner

CONFIGURATION FOR ELECTROCHEMICAL WATER TREATMENT

CROSS-REFERENCE TO RELATED APPLICATION

This application claims the benefit of U.S. Provisional Patent Application Ser. No. 62/383,092, filed Sep. 2, 2016, the disclosure of which is incorporated herein by reference in its entirety for all purposes.

FIELD OF THE INVENTION

This invention relates to the field of water treatment, and in particular to configurations for electrochemical water treatment.

BACKGROUND

Both potable water and wastewater contain microorganisms and other impurities. Various water treatment systems are provided in the prior art for destroying bacteria and other impurities from potable water and disinfecting the water to a level suitable for human and animal use. Other water treatment systems treat wastewater by reducing the infectious components to levels which are not suitable for human or animal consumption, but are satisfactory for discharge into various water bodies. Still other water treatment systems may be applied in both potable water and wastewater applications to reduce the contamination level to certain specified governmental standards. Historically, the use of chlorination for disinfection has been pervasive. In recent years, systems employing ultraviolet radiation, or the introduction of ozone, have been commercialized as well.

Pioneering inventions in the area of electrochemical water processing have been issued to the applicant of the present invention, namely, U.S. Pat. Nos. 6,780,306, 7,033,481, 7,494,582, 7,604,728, and 8,961,751, the disclosures of which are incorporated herein by reference in their entireties.

The present invention relates to improvements to the apparatus described above, or to solutions to some of the problems raised or not solved thereby.

SUMMARY OF THE INVENTION

Electrochemical water disinfection is a highly efficient way to treat water. The process works without the addition of chemical compounds to the water to be treated, but is based on the biocidal action of various chemical substances. Electrodes with platinum group metals or their oxides as active coatings are generally the best suited to this treatment.

The invention provides several advantages over the current art. The invention provides high fluid velocity to promote self-cleaning and reduce the scaling characteristics typically found in these designs. Discrete reactor packs are provided, for easy replacement. Electrically isolated electrode packs provide series or parallel connections that optimize the power usage. The configurable design is capable of meeting any flow and dosing requirement. Units can be connected in series or parallel to meet the needs of an individual installation.

The invention provides an electrochemical water treatment apparatus, for electrical connection to a power supply, and for connection to a source of water to be treated, on its way to a destination. The apparatus includes a treatment chamber formed by at least one wall and having a length, an inlet end and an outlet end, and at least one side, the treatment chamber having an opening formed along the side for substantially the length of the treatment chamber. A mounting plate covers the opening, so as to seal the side of the chamber and prevent water to be treated from escaping via the opening. A plurality of cathodes, each having two ends, are mounted to the mounting plate and positioned inside the chamber. A plurality of anodes are mounted to the mounting plate and positioned inside the chamber, and have two sides and two ends, each of the anodes having at least one cathode positioned on each of the two sides of the respective anode. At least two anode bus bars are provided, each anode bus bar connectable to the power supply and connected to the anodes near a respective end of the anodes opposite to where the other anode bus bar is connected. At least two cathode bus bars are also provided, each cathode bus bar connectable to the power supply and connected to the cathodes near a respective end of the cathodes opposite to where the other cathode bus bar is connected. An inlet adapter has a first end and a second end, for connecting the treatment chamber inlet end to the source of water to be treated, the inlet adapter having a smaller cross sectional area at the first end connected to the treatment chamber inlet end, and a larger cross sectional area at the opposite end connected to the source of water to be treated. An outlet adapter has a first end and a second end, for connecting the treatment chamber outlet end to the destination, the outlet adapter having a smaller cross sectional area at the first end connected to the treatment chamber outlet end, and a larger cross sectional area at the second end connected to the destination.

Other objects and advantages of the invention will become apparent hereinafter.

DETAILED DESCRIPTION

Figure 1:
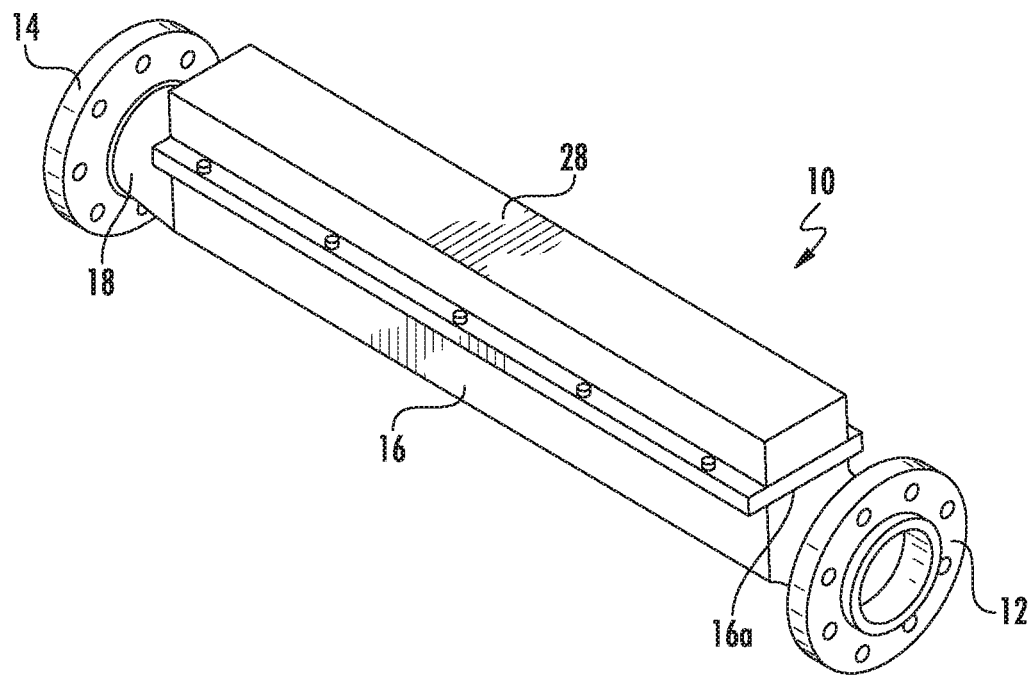
FIG. 1 is an isometric view of an electrochemical water treatment apparatus according to one embodiment of the invention.
Figure 2:
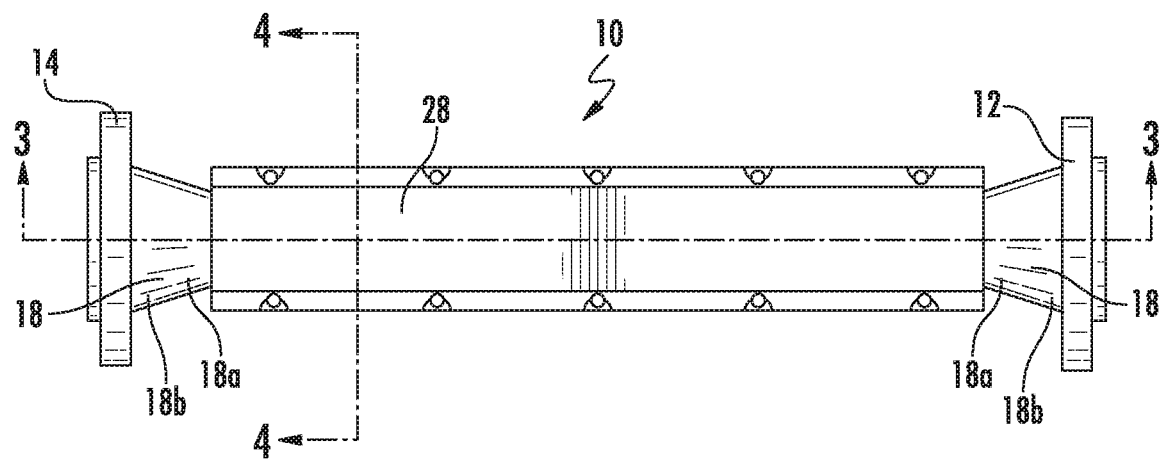
FIG. 2 is a top plan view of the electrochemical water treatment apparatus shown in FIG. 1.

Referring now to FIGS. 1 and 2, there is shown a water treatment apparatus 10 constructed according to an embodiment of the invention. As there shown, the apparatus 10 includes an inlet end connector 12 and an outlet end connector 14, which may be structurally identical. Inlet end connector 12 is provided for connecting the apparatus 10 to any suitable source of water to be treated, and outlet end 14 is provided for connecting the apparatus 10 to any suitable destination for the now-treated water. Examples include any application where treatment and disinfection of water is needed, anything from a seawater inlet for an ocean-going ship to a factory water discharge into a nearby waterway to simple water transport from a well or other water source for drinking water.

According to the invention, the end connectors 12 and 14 are connected to opposite ends of a treatment chamber 16, each by means of a respective inlet adapter and outlet adapter 18. While the end connectors 12 and 14 and treatment chamber 16 may be of any suitable shape, in the embodiment shown, the end connectors have a circular cross section, and the treatment chamber has a square cross section. According to the invention, the cross sectional area of the end connectors 12 and 14 is larger than the cross sectional area of the treatment chamber 16, so that the adapters 18 are funnel-shaped. In one example, the end connectors 12 and 14 have a circular cross section with a 6-inch diameter, whereas the treatment chamber 16 is formed as a square tube, with a cross section 4 inches on a side.

As shown in FIG. 2, each funnel-shaped adapter 18 has a smaller end 18a and a larger end 18b. Such terms "larger" and "smaller" refer to cross-sectional area. At each end of the treatment chamber 16, a smaller end 18a of each funnel-shaped adapter 18 is connected. The larger end 18b of each funnel-shaped adapter 18 is connected to a respective one of the end connectors 12 and 14.

Figure 3:
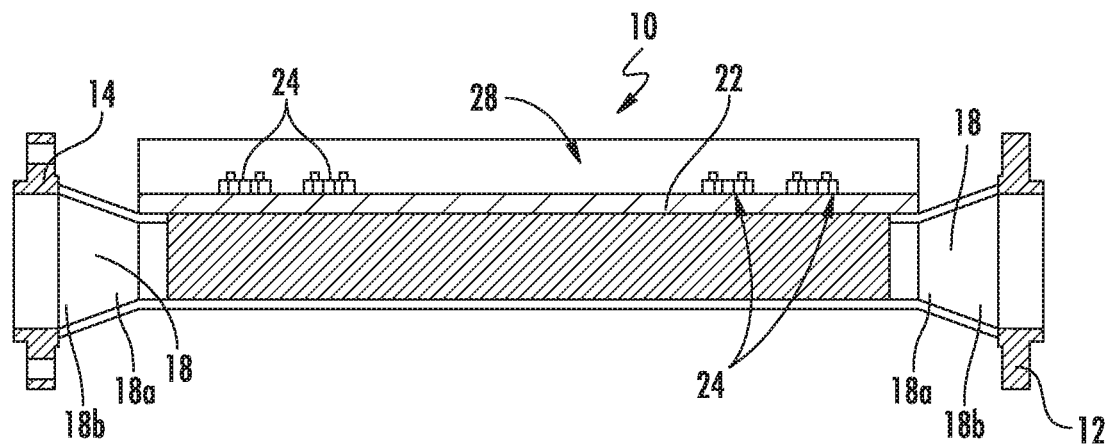
FIG. 3 is a cross sectional view of the electrochemical water treatment apparatus shown in FIG. 2, taken along line 3-3.
Figure 4:
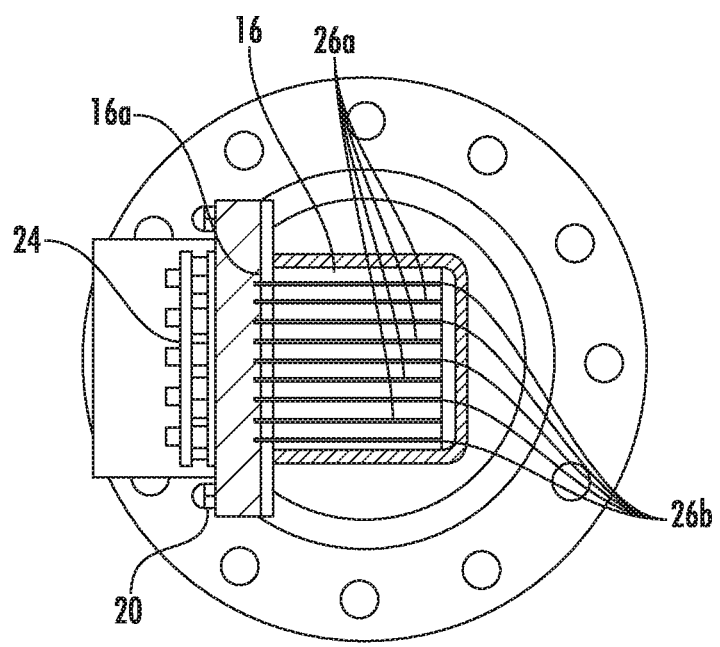
FIG. 4 is a cross sectional view of the electrochemical water treatment apparatus shown in FIG. 2, taken along line 4-4.
Figure 5:
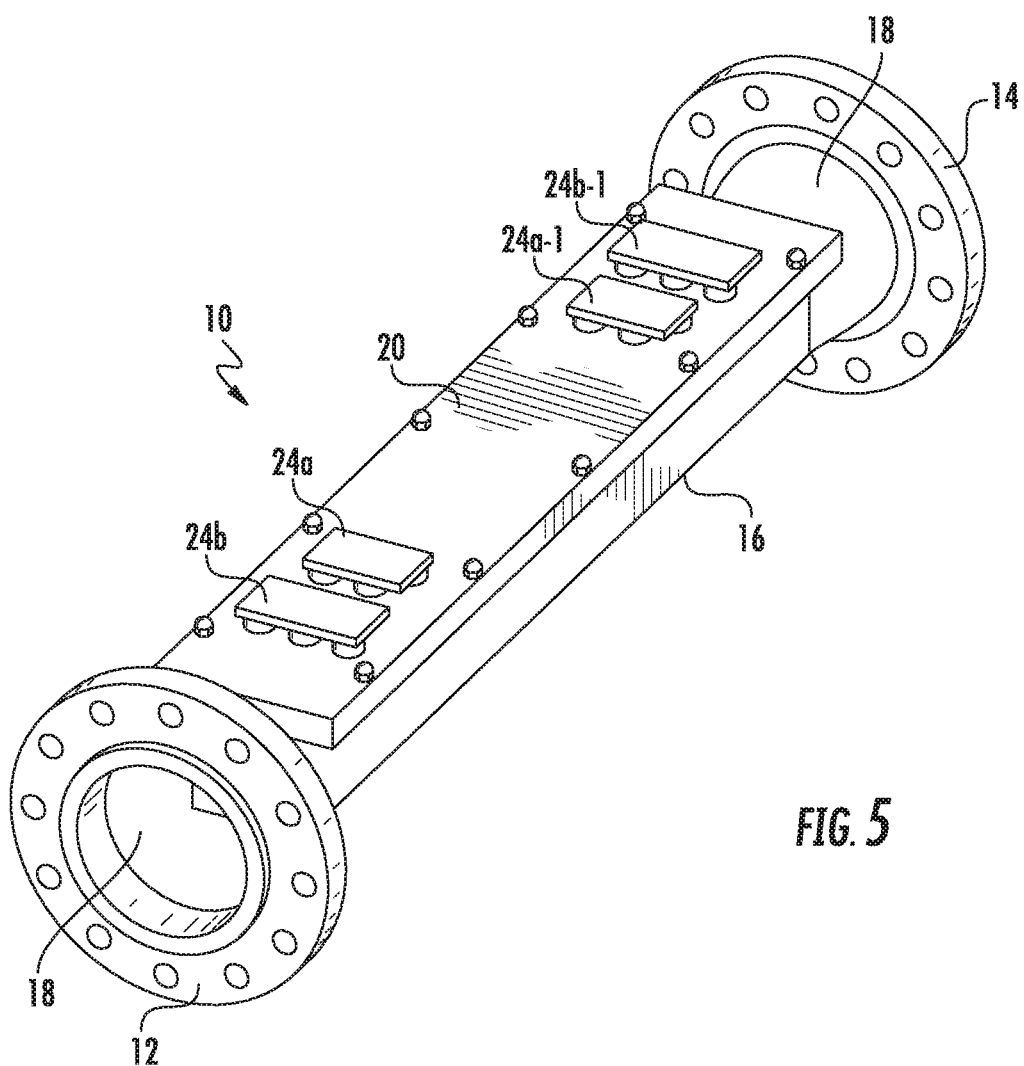
FIG. 5 is an isometric view of the electrochemical water treatment apparatus shown in FIG. 1, with the cover removed to show components underneath.

In some embodiments, the treatment chamber 16 is formed on three sides by plain walls, with an opening 16a on the fourth side, although it could be formed by a singled curved wall with an opening 16a. In the embodiment shown, this opening 16a runs substantially the entire length of the treatment chamber 16. The fourth wall is formed, or it could equally well be said that the opening 16a is covered or closed, by an electrode mounting plate 20. It is important that the water being treated not escape around the electrode mounting plate 20, so the mounting plate is sealed to the opening 16a so as to avoid leakage. As shown in FIGS. 3, 4 and 5, an insulator 22 is mounted to the mounting plate 20, outside the treatment chamber 16. A number of bus bars 24 are in turn mounted to the insulator 22, to the side of the insulator opposite the mounting plate 20. As will be explained presently, there are anode bus bars 24a and cathode bus bars 24b.

On the opposite side of the mounting plate 20, and, upon assembly, projecting through the opening 16a so as to be positioned inside the treatment chamber 16, are mounted a number of electrodes 26, in essence conductive plates. As shown best in FIGS. 4 and 6, the electrodes 26 may reach to the full depth of the treatment chamber, and may run as much as the length of the treatment chamber. Some of the electrodes 26 are anodes 26a, and some are cathodes 26b. The anodes 26a and the cathodes 26b are positioned in alternating fashion, so that each anode 26a is flanked by a cathode 26b on each side thereof, and in most cases each cathode 26b is flanked by an anode 26a on each side thereof. In the embodiment shown, the alternating cathodes 26b outnumber the alternating anodes 26a by 1, so that the outermost electrodes on both sides are cathodes. Thus both sides of all anodes 26a are surrounded by cathodes 26b, and therefore in use during treatment of the water. While different numbers of anodes and cathodes may be used, in the embodiment shown, there are five cathodes 26b and four anodes 26a.

Figure 6:
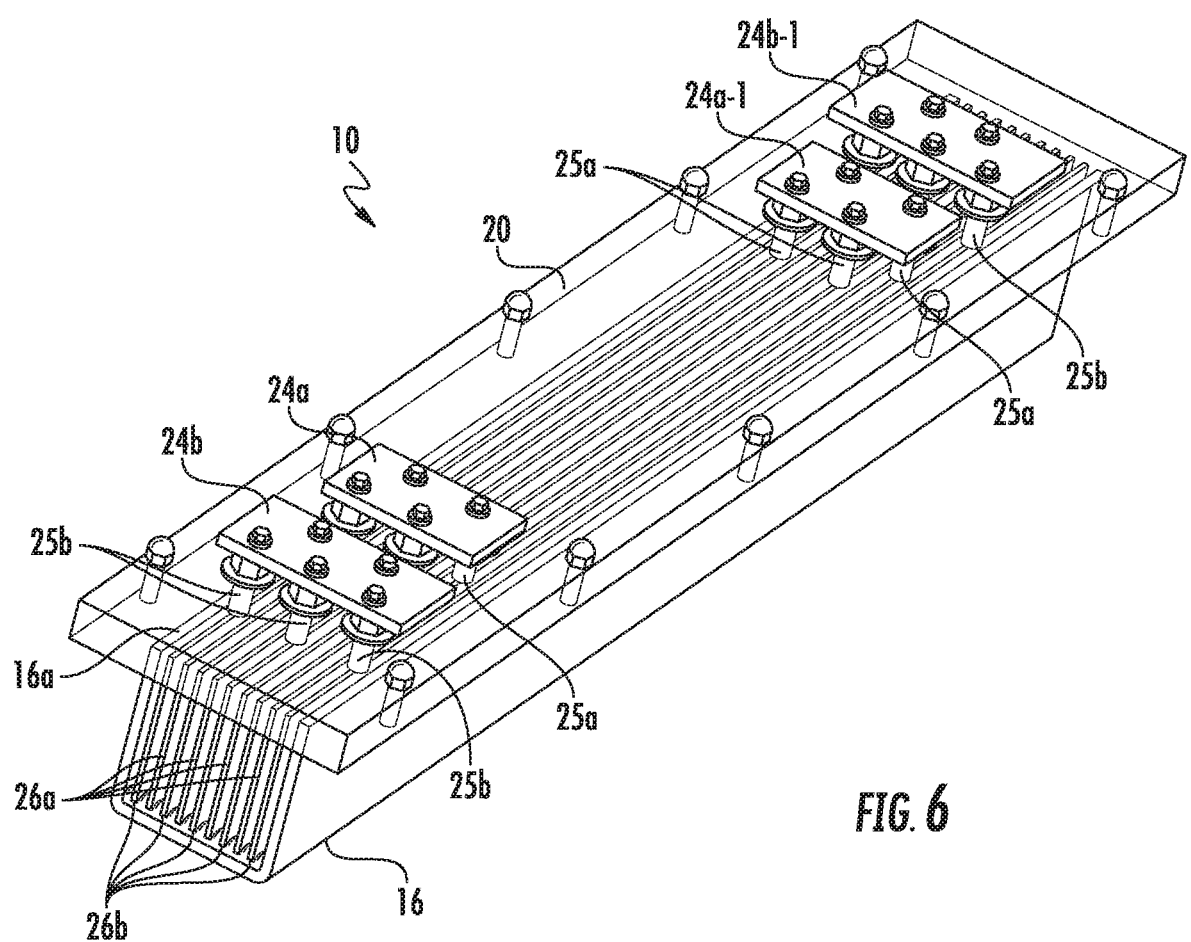
FIG. 6 is an isometric view of the electrochemical water treatment apparatus shown in FIG. 5, but with the end connectors removed, and the electrode mounting plate made transparent, so as to make the electrodes visible inside the treatment chamber and so as to make the connections between the bus bars and the electrodes visible.

In the embodiment shown, as introduced above, and as shown best in FIG. 6, the bus bars 24 are connected to respective ones of the anodes 26a and cathodes 26b by means of connector pins 25. In effect, the connector pins 25 are dual function parts. They provide structural mounting of the electrodes 26 with respect to the mounting plate 20, while at the same time providing the necessary electrical connection. As shown best in FIG. 6, anode bus bar 24a is connected to the anodes 26a near one end of the anodes by means of anode connector pins 25a, and anode bus bar 24a-1 is connected to the anodes 26a near the opposite end of the anodes, by means of additional anode connector pins 25a. At least, the anode bus bars 24a and 24a-1 are separated from each other by a majority of the length of the anodes. Similarly, cathode bus bar 24b is connected to the cathodes 26b near one end by cathode connector pins 25b, while cathode bus bar 24b-1 is connected to the cathodes 26b near the opposite end, again by means of additional cathode connector pins 25b. Here again, at least, the cathode bus bars 24b and 24b-1 are separated from each other by a majority of the length of the cathodes. The purpose of having multiple anode bus bars connected to each anode and multiple cathode bus bars connected to each cathode is two-fold. One purpose is electrical. There are applications where the amount of current passing through the system is at a level that a single connector pin 25 would not be sufficient to carry the current, unless the pin were increased in size. But increasing pin size to the extent necessary to carry larger currents could result in electrode separation that would be greater than optimal, as larger plate gap decreases efficiency. Multiple connector pins 25 permit an assembly 10 where multiple smaller pins can carry larger currents than a single pin could, which still allowing a relatively small electrode separation. The other purpose is structural. If each electrode 26 were mounted to the mounting plate 20 by a means of single connector pin 25, whether in the middle or nearer one end or the other, it would be more possible for the electrode to flex or move, with the resulting effect on electrode separation. With two bus bars 24 and two connector pins 25 for each electrode 26, generally opposite each other with one nearer each end, the result is better structural rigidity, soundness, and stability, with increased current capacity, and therefore, increased treatment capacity.

In use, a power supply (not shown) is connected to the anode bus bars 24a and 24a-1 and to the cathode bus bars 24b and 24b-1, so as to power the apparatus 10. In some embodiments, a protective shield or cover 28 is applied over the bus bars 24.

The purpose of the different sizes of the end connectors 12 and 14, and treatment chamber 16, and the funnel-shaped adapters 18, is to, by means of the Bernoulli Effect, cause the fluid moving through the treatment chamber to speed up, to move at a higher velocity. That is, the vessel leading to the inlet end connector 12 and the vessel leading away from the outlet end connector 14 are larger in cross-sectional area than is the treatment chamber 16. This effect can be especially beneficial when treating such natural sources of water as seawater, with the higher fluid velocity reducing scaling on the electrodes.

In some embodiments, the electrodes 26, bus bars 24, insulator 22 and mounting plate 20 are assembled as a unit, and can be easily removed and replaced into the treatment chamber 16, so as to enable quick changeover for different treatment options, or electrodes of different materials, or to allow easy removal of the electrodes for cleaning. For example, in some embodiments the anodes are formed of a titanium substrate, and then coated or plated with platinum or platinum group catalysts, or with MMO (mixed metal oxide). The mixture in the MMO coatings includes primarily iridium and ruthenium. Various ratios of these two metals may be used, as is known to a person in the art. Cathodes are generally formed of Hastelloy with no coating. Functionally, the water treatment apparatus 10 works on the same general principles of electrochemical treatment of water as set forth in U.S. Pat. Nos. 6,780,306 and 7,033,481, already incorporated by reference above.

Figure 7:
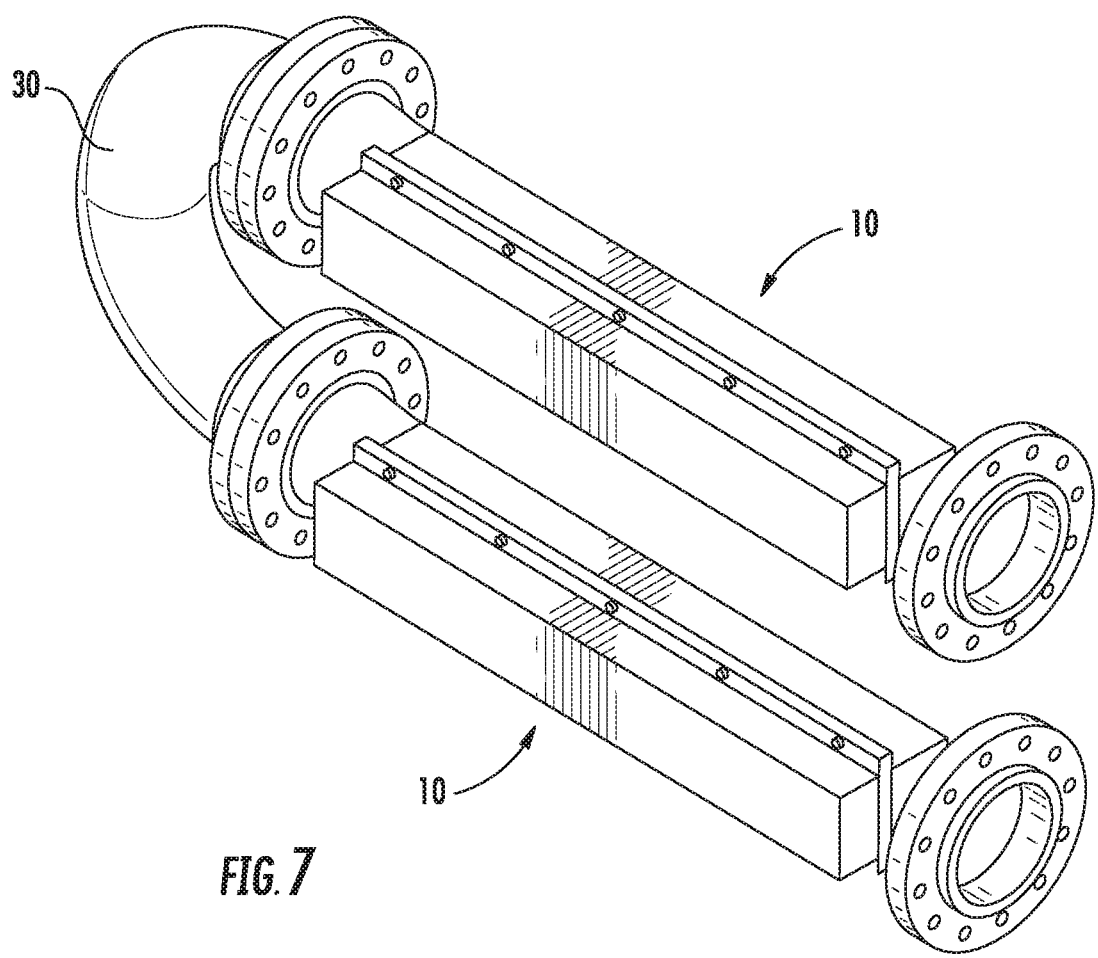
FIG. 7 is an isometric view of a particular application of the electrochemical water treatment apparatus according to the invention.

An example of an application of the modular nature of the invention is shown in FIG. 7. While they can be made of any suitable size, in the example shown in FIG. 7, each apparatus 10 is four feet in total length, each with a treatment chamber of three feet in length. Two apparatuses 10 are connected in series, connected by a U-shaped connector 30 so as to minimize space requirements. In this technology, dosage is stated in the units of current per flow rate, that is, amperes per gallon per minute. So an example of a dosage that could be provided by the assembly shown in FIG. 7 would be a dosage of 2, that is, 2 amperes per gallon per minute (A/GPM). Generally dosages would typically be in the range of 0.5-25 A/GPM, and more preferably a range of 0.5 to 2 A/GPM. In a particular application, two or more apparatuses 10 could also be connected in parallel.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An electrochemical water treatment apparatus, for electrical connection to a power supply, and for connection to a source of water to be treated, the treated water thereafter being permitted to flow to a destination, the apparatus comprising:
    a treatment chamber formed by at least one wall and having a length, an inlet end and an outlet end, and at least one side, the treatment chamber having an opening formed along the side for substantially the length of the treatment chamber;
    a mounting plate covering the opening, so as to seal the side of the chamber and prevent water to be treated from escaping via the opening;
    at least two cathodes, each cathode having two ends, and each cathode mounted to the mounting plate and positioned inside the chamber;
    at least two anodes, each anode having two sides and two ends, and each anode mounted to the mounting plate and positioned inside the chamber, each of the anodes having at least one of the cathodes positioned on each of the two sides of the anode;
    a first anode bus bar connectable to the power supply and connected to each of the anodes near one end of the anodes and a second anode bus bar connectable to the power supply and connected to each of the anodes near the other end of the anodes, opposite to where the first anode bus bar is connected to the anodes;
    a first cathode bus bar connectable to the power supply and connected to each of the cathodes near one end of the cathodes and a second cathode bus bar connectable to the power supply and connected to each of the cathodes near the other end of the cathodes, opposite to where the first cathode bus bar is connected to the cathodes;
    an inlet adapter having a first end and a second end, for connecting the treatment chamber inlet end to the source of water to be treated, the inlet adapter having a smaller cross sectional area at the first end connected to the treatment chamber inlet end, and having a larger cross sectional area at the second end connected to the source of water to be treated; and
    an outlet adapter having a first end and a second end, for connecting the treatment chamber outlet end to the destination, the outlet adapter having a smaller cross sectional area at the first end connected to the treatment chamber outlet end, and a larger cross sectional area at the second end connected to the destination.

2. A treatment apparatus as claimed in claim 1 wherein each of the anodes runs substantially the length of the treatment chamber.

3. A treatment apparatus as claimed in claim 1 wherein each of the cathodes runs substantially the length of the treatment chamber.

4. A treatment apparatus as claimed in claim 1 further comprising an inlet end connector for connecting the inlet adapter to the source and an outlet end connector for connecting the outlet adapter to the destination.

5. A treatment apparatus as claimed in claim 4 wherein the treatment chamber has a different cross sectional shape than the inlet end connector and the outlet end connector.

6. A treatment apparatus as claimed in claim 5 wherein the treatment chamber has a square cross section and each of the inlet end connector and the outlet end connector have a circular cross section.

7. An electrochemical water treatment apparatus comprising:
    a treatment chamber formed by at least one wall and having a length, an inlet end and an outlet end, and at least one side, the treatment chamber having an opening formed along the side for substantially the length of the treatment chamber;
    a mounting plate attached to the opening;
    at least two cathodes, each cathode having two ends, and each cathode mounted to the mounting plate and positioned inside the chamber, and connectable to a source of electrical power;
    at least two anodes, each anode mounted to the mounting plate and positioned inside the chamber, each anode having two sides and two ends, and each anode having at least one cathode positioned on each of the two sides of the anode and connectable to the source of electrical power;
    an inlet adapter having a first end and a second end, for connecting the treatment chamber inlet end to a source of water to be treated, the inlet adapter having a smaller cross sectional area at the first end connected to the treatment chamber inlet end, and a larger cross sectional area at the second end connected to the source of water to be treated; and
    an outlet adapter having a first end and a second end, for connecting the treatment chamber outlet end to a destination, the outlet adapter having a smaller cross sectional area at the first end connected to the treatment chamber outlet end and a larger cross sectional area at the second end connected to the destination.

8. A treatment apparatus as claimed in claim 7 further comprising:
   at least two anode bus bars, each anode bus bar connectable to the source of electrical power, and at least one of the at least two anode bus bars connected to the anodes near a first of the two ends of the anodes and at least one other of the at least two anode bus bars connected to the anodes at the other of the two ends of the anodes;
   at least two cathode bus bars, each cathode bus bar connectable to the source of electrical power and at least one of the at least two cathode bus bars connected to the cathodes near a first of the two ends of the cathodes and at least one other of the at least two cathode bus bars connected to the cathodes at the other of the two ends of the cathodes.

9. A treatment apparatus as claimed in claim 7 wherein each of the anodes runs substantially the length of the treatment chamber.

10. A treatment apparatus as claimed in claim 7 wherein each of the cathodes runs substantially the length of the treatment chamber.

11. A treatment apparatus as claimed in claim 7 further comprising an inlet end connector for connecting the inlet adapter to a source of water to be treated and an outlet end connector for connecting the outlet adapter to the source of water to be treated.

12. A treatment apparatus as claimed in claim 11 wherein the treatment chamber has a different cross sectional shape than the inlet end connector and the outlet end connector.

13. A treatment apparatus as claimed in claim 12 wherein the treatment chamber has a square cross section and each of the inlet end connector and the outlet end connector have a circular cross section.

14. An electrochemical water treatment apparatus, for electrical connection to a power supply, and for connection to a source of water to be treated, the treated water thereafter being permitted to flow to a destination, the apparatus comprising:
   a treatment chamber formed by at least one wall and having a length, an inlet end and an outlet end, and at least one side, the treatment chamber having an opening formed along the side for substantially the length of the treatment chamber;
   a mounting plate covering the opening, so as to seal the side of the chamber and prevent water to be treated from escaping via the opening;
   at least two cathode surfaces, each cathode surface having two ends, and each cathode surface positioned inside the chamber;
   at least two anode surfaces, each anode surface having two ends, and each anode surface positioned inside the chamber, each of the anode surfaces having at least one of the cathode surfaces positioned in facing relationship thereto;
   a first anode bus bar connectable to the power supply and connected to each of the anode surfaces near one end of the anode surfaces and a second anode bus bar connectable to the power supply and connected to each of the anode surfaces near the other end of the anode surfaces, opposite to where the first anode bus bar is connected to the anode surfaces;
   a first cathode bus bar connectable to the power supply and connected to each of the cathode surfaces near one end of the cathode surfaces and a second cathode bus bar connectable to the power supply and connected to each of the cathode surfaces near the other end of the cathode surfaces, opposite to where the first cathode bus bar is connected to the cathode surfaces;
   an inlet adapter having a first end and a second end, for connecting the treatment chamber inlet end to the source of water to be treated, the inlet adapter having a smaller cross sectional area at the first end connected to the treatment chamber inlet end, and having a larger cross sectional area at the second end connected to the source of water to be treated; and
   an outlet adapter having a first end and a second end, for connecting the treatment chamber outlet end to the destination, the outlet adapter having a smaller cross sectional area at the first end connected to the treatment chamber outlet end, and a larger cross sectional area at the second end connected to the destination.

15. A treatment apparatus as claimed in claim 14 wherein each of the anode surfaces runs substantially the length of the treatment chamber.

16. A treatment apparatus as claimed in claim 14 wherein each of the cathode surfaces runs substantially the length of the treatment chamber.

17. A treatment apparatus as claimed in claim 14 further comprising an inlet end connector for connecting the inlet adapter to the source and an outlet end connector for connecting the outlet adapter to the destination.

18. A treatment apparatus as claimed in claim 17 wherein the treatment chamber has a different cross sectional shape than the inlet end connector and the outlet end connector.

19. A treatment apparatus as claimed in claim 18 wherein the treatment chamber has a square cross section and each of the inlet end connector and the outlet end connector have a circular cross section.

* * * * *